US012570139B2

(12) United States Patent
Lindberg et al.

(10) Patent No.: US 12,570,139 B2
(45) Date of Patent: Mar. 10, 2026

(54) MODULAR AERO DEVICE ACTUATOR AND A MODULAR ACTIVE GRILLE SHUTTER SYSTEM HAVING A REDUCED NUMBER OF VANES

(71) Applicant: Magna Exteriors Inc., Concord (CA)

(72) Inventors: Braendon R. Lindberg, Metamora, MI (US); Ted E. Peterson, Howell, MI (US); Sohan Shintre, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 584 days.

(21) Appl. No.: 17/783,044

(22) PCT Filed: Dec. 23, 2020

(86) PCT No.: PCT/US2020/066803
§ 371 (c)(1),
(2) Date: Jun. 7, 2022

(87) PCT Pub. No.: WO2021/133890
PCT Pub. Date: Jul. 1, 2021

(65) Prior Publication Data
US 2023/0010412 A1     Jan. 12, 2023

Related U.S. Application Data

(60) Provisional application No. 62/954,157, filed on Dec. 27, 2019.

(51) Int. Cl.
*B60K 11/08*          (2006.01)
(52) U.S. Cl.
CPC .................................. *B60K 11/085* (2013.01)
(58) Field of Classification Search
CPC ...... B60K 11/085; Y02T 10/88; F24F 13/082; F24F 13/10; B60Y 2306/05; B60Y 2400/40; B60Y 2410/10
See application file for complete search history.

(56) References Cited

U.S. PATENT DOCUMENTS 10,040,344 B2 *  8/2018  Schöning ................ B60R 19/48
10,272,768 B2 *  4/2019  Huijzers ................ B60K 11/06
(Continued)

FOREIGN PATENT DOCUMENTS

DE     102017105568 A1     9/2018
DE     102017107384 A1     10/2018
(Continued)

OTHER PUBLICATIONS

Notification of Transmittal of the International Search Report and the Written Opinion of the International Searching Authority for International Application No. PCT/US2020/066803; Mailed Jul. 2, 2021.

(Continued)

*Primary Examiner* — Kurt Philip Liethen

(57) ABSTRACT

A modular active grille shutter system that includes a frame connected to an automobile at a location forward of an engine or energy source such as a battery pack. The frame is formed from assembling several different sized components to create a cooling aperture. The modular active grille shutter system also includes an actuator pocket in the frame, the actuator pocket has an aperture and a surface that forms side walls of a pocket and the surface also includes a vane connection side. There is a plurality of alternate actuator output axes located within the actuator pocket, which depending on the actuator design they represent different possible locations for alignment of the actuator with the three vanes.

7 Claims, 18 Drawing Sheets

(56) References Cited

U.S. PATENT DOCUMENTS

| | | | | |
|---|---|---|---|---|
| 10,556,501 | B2 * | 2/2020 | Herlem ................ | B60K 11/085 |
| 10,960,754 | B2 | 3/2021 | Lindberg et al. | |
| 2010/0282438 | A1 * | 11/2010 | Wirth .................. | B60K 11/085 |
| | | | | 165/67 |
| 2012/0119059 | A1 * | 5/2012 | Crane .................... | F24F 13/20 |
| | | | | 248/674 |
| 2013/0146375 | A1 * | 6/2013 | Lee ...................... | B60K 11/085 |
| | | | | 180/68.1 |
| 2014/0129078 | A1 | 5/2014 | Jeong et al. | |
| 2014/0216834 | A1 * | 8/2014 | Elliott .................. | B60K 11/085 |
| | | | | 180/68.1 |
| 2017/0001514 | A1 * | 1/2017 | Watari ................ | B60K 11/085 |

FOREIGN PATENT DOCUMENTS

| | | | |
|---|---|---|---|
| FR | 3056464 | A1 | 3/2018 |
| WO | 2019020510 | A1 | 1/2019 |
| WO | 2021019954 | A1 | 2/2021 |

OTHER PUBLICATIONS

European Search Report for application 23207859.2, Mailed Apr. 8, 2024.

* cited by examiner 46b, 146b, 246b,
48b, 148b, 248b

60a

62a

62b

65a

65b 46a, 146a, 246a,
48a, 148a, 248a

64a

66a

64a

66b

MODULAR AERO DEVICE ACTUATOR AND A MODULAR ACTIVE GRILLE SHUTTER SYSTEM HAVING A REDUCED NUMBER OF VANES

FIELD OF THE INVENTION

The present invention relates to a modular active grille shutter system with a reduced actuator pocket to provide a system having a reduced number of vanes as the base components of the system.

BACKGROUND OF THE INVENTION

Conventional active grille shutter systems are typically limited to a minimum of five vanes or shutters. One of the reasons for this is that in many current systems, the active grille shutter system is being utilized in connection with an internal combustion engine and the cooling aperture of the active grille shutter system is quite large. Typically, the cooling aperture is the size of what is commonly referred to as the vehicle grille, located forward of the radiator of the car. Such active grille shutter systems rely on an actuator that requires a pocket or packaging space that is quite robust, as a result the actuator has a significant vertical height.

As more and more alternative fuel vehicles, such as electrical vehicles enter the market, the large cooling apertures provided by conventional active grille shutter systems are not necessarily due to the fact that there are no large radiators for cooling an internal combustion engine. Electric vehicles in particular do require a certain amount of cooling for the battery packs; however, the cooling aperture is much shorter and does not require as much vertical height. As a result, the number of vanes needed for an active grille shutter system on an electric vehicle is less than five, preferably three vanes, which shortens the height of the active grille shutter system.

In order to provide a smaller active grille system using less than five vanes, the frame of the active grille system will be smaller, which also requires the actuator pocket of the frame and any actuator for the active grille shutter system to also be smaller. Therefore, it is an object of the invention to provide a modular active grille shutter system having a reduced actuator pocket size. It is also an object of the invention to provide an actuator that is also smaller and can fit within the smaller pocket size. Additionally, it is desirable to develop an actuator pocket and actuator that provides various output axes so that the driven vane and actuator is not always fixed to one location on the modular active grille shutter system, but instead any one of the vanes can be the driven vane.

It is further an object of the invention to provide an actuator for any sized modular active grille shutter system that is preprogrammed for use with any size modular grille, by implementing a modular or block communication software programmed on the actuator, that allows standard application adaptation with only parameter inputs.

In another aspect of the invention the positioning of an actuator during assembly is often complex and involves motions and various fastener types to fix the actuator to the assembly. Additionally, the connector is typically connected in a downward location. Typical actuators today are not able to be used in a package space allotted for a grille having three vanes. Also, actuators today typically require new software programming to develop the communication method between the aero device and the vehicle. This is typically custom and can be a significant portion of the system development timeline.

It is an object of the invention to create an actuator that assembles in one degree of freedom (DOF) only and firmly attaches with a fastener less attachment method that prevents torque rotation and rattle.

SUMMARY OF THE INVENTION

The present invention is directed to a modular active grille shutter system that includes a frame connected to an automobile at a location forward of an engine or energy source such as a battery pack. The frame is formed from assembling several different sized components to create a cooling aperture. The modular active grille shutter system includes an active grille shutter system having a frame located in a cooling pathway of a power source for the vehicle. The frame includes a base end cap with an actuator pocket having a plurality of alternate actuator output axes located within the actuator pocket. The modular active grille shutter system also includes a plurality of vanes extending across the cooling aperture of the frame and rotatably connected to the frame, to rotate between an open position where air can move through the frame and a closed position where the plurality of vanes block air from moving through the cooling aperture. Each of the plurality of vanes are connected to the vane side of the actuator pocket and one of the plurality of vanes is in alignment with one of the plurality of alternate actuator output axes, and functions as a driven vane for the plurality of vanes.

Further provided is an actuator having a housing with a rotatable output positioned in an aperture formed in the housing. The aperture and rotatable output are formed at a location that is alignable with one of the plurality of alternate output axes. The actuator is operably connected to the plurality of vanes such that rotation of the actuator output will rotate the plurality of vanes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
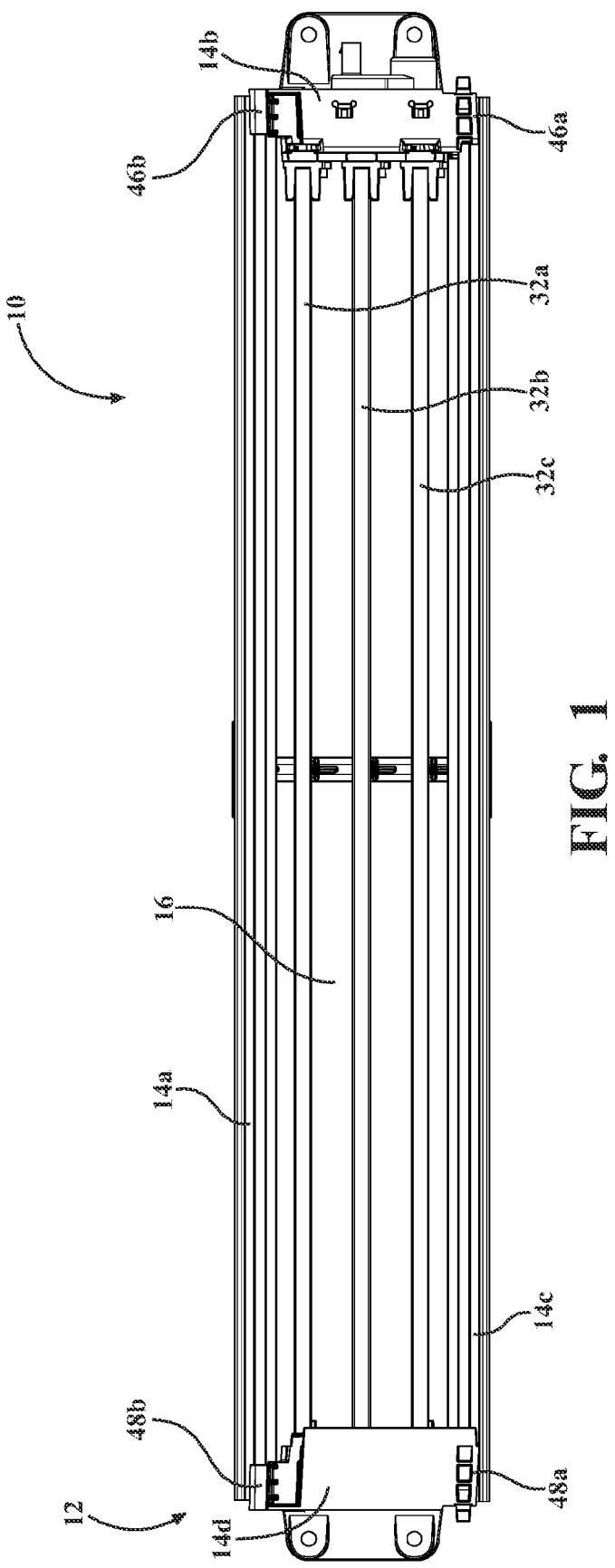
FIG. 1 is first side plan view of a modular active grille shutter arrangement according to a first embodiment of the invention.

The following description of the preferred embodiments are merely exemplary in nature and are in no way intended to limit the invention, its application, or uses.

Referring now to all of the figures, the present invention is directed to a modular active grille shutter system 10 that includes a frame 12 connected to an automobile at a location forward of an engine or energy source such as a battery pack. The frame 12 is formed from assembling several different sized components including a first universal frame rail 14a, connected between a first base integrated end cap 14b and first base non-integrated end cap 14d. There is also a second universal frame rail 14c that connects between the first base integrated end cap 14b and second base non-integrated end cap 14d. When the different sized components are all assembled the frame 12 forms a cooling aperture 16. While a single cooling aperture 16 is shown, it is within the scope of the invention for the modular active grille shutter system 10 to have multiple cooling apertures depending on the desired frame design.

Figure 3:
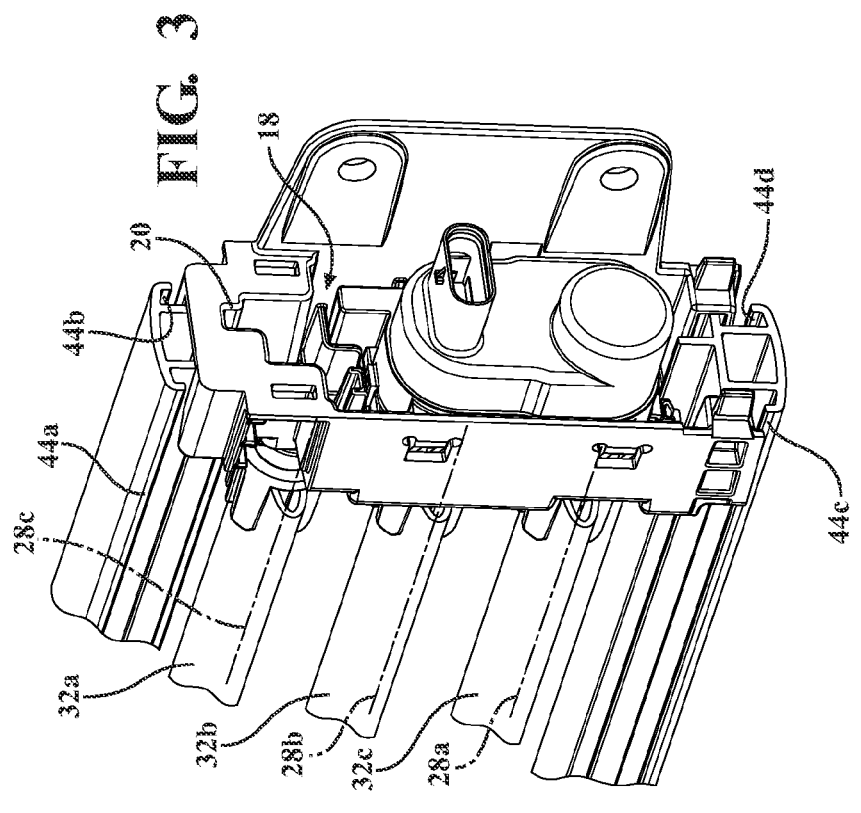
FIG. 3 is a side perspective view of the actuator connected to the actuator pocket of the frame.
Figure 6:
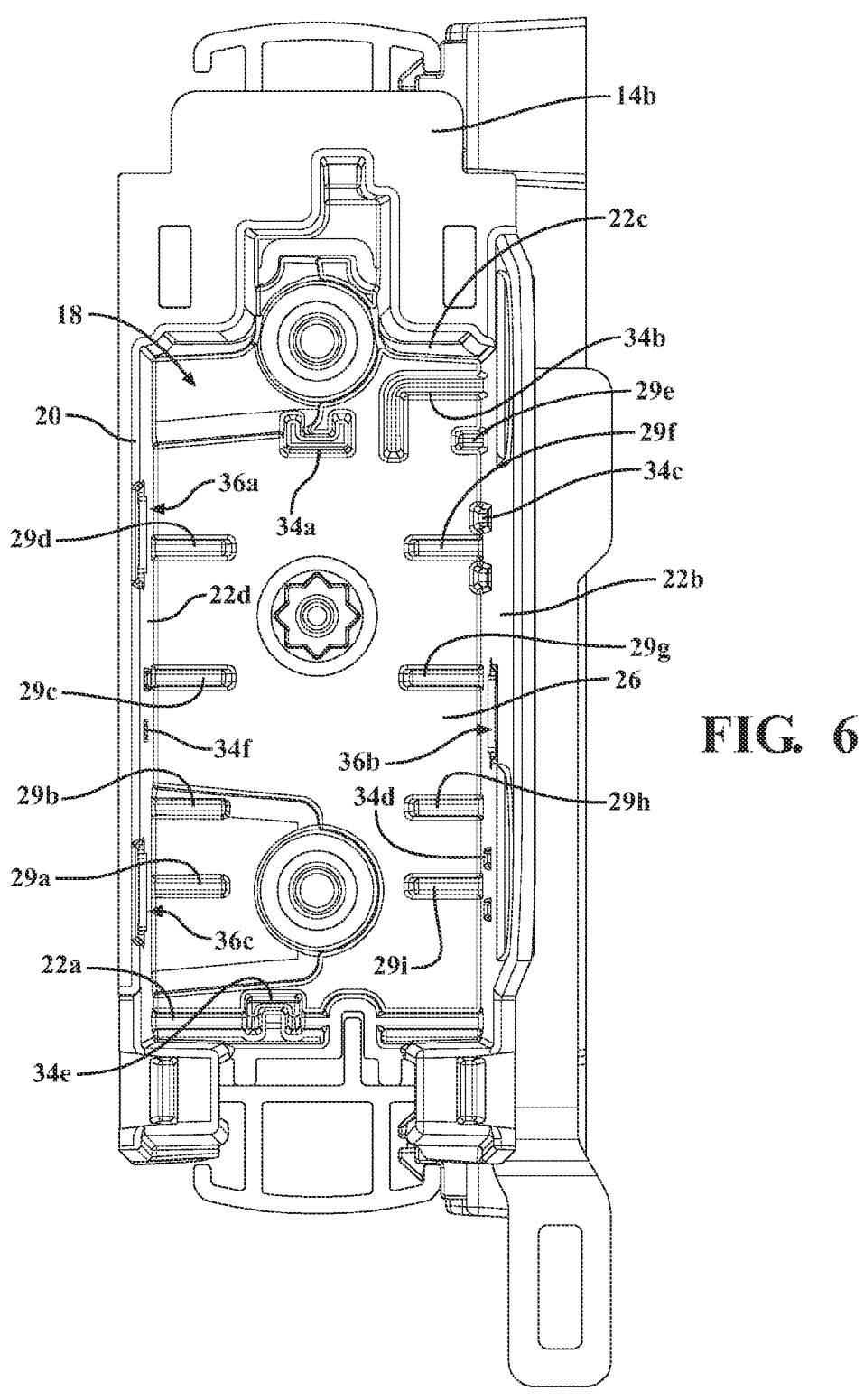
FIG. 6 is an end plan view of the actuator pocket of the frame.

The modular active grille shutter system 10 further includes an actuator pocket 18 in the frame 12. Referring now to FIG. 6 the actuator pocket 18 has an aperture 20 and a surface that from a vane connection side with side walls 22a, 22b, 22c extending perpendicularly therefrom. Referring to FIG. 2 a plurality of alternate actuator output axes 28a, 28b, 28c is shown extending through the actuator pocket 18, which depending on the actuator design they represent different possible locations for alignment of an actuator 30 with three vanes 32a, 32b, 32c, shown in FIG. 3. While certain drawings depict three vanes, other drawings depict five vanes. It is within the scope of this invention for the modular active grill shutter system 10 to have any number of vanes, however, in one preferred embodiment of the invention, shown in FIG. 1 there are three vanes.

Figure 4A:
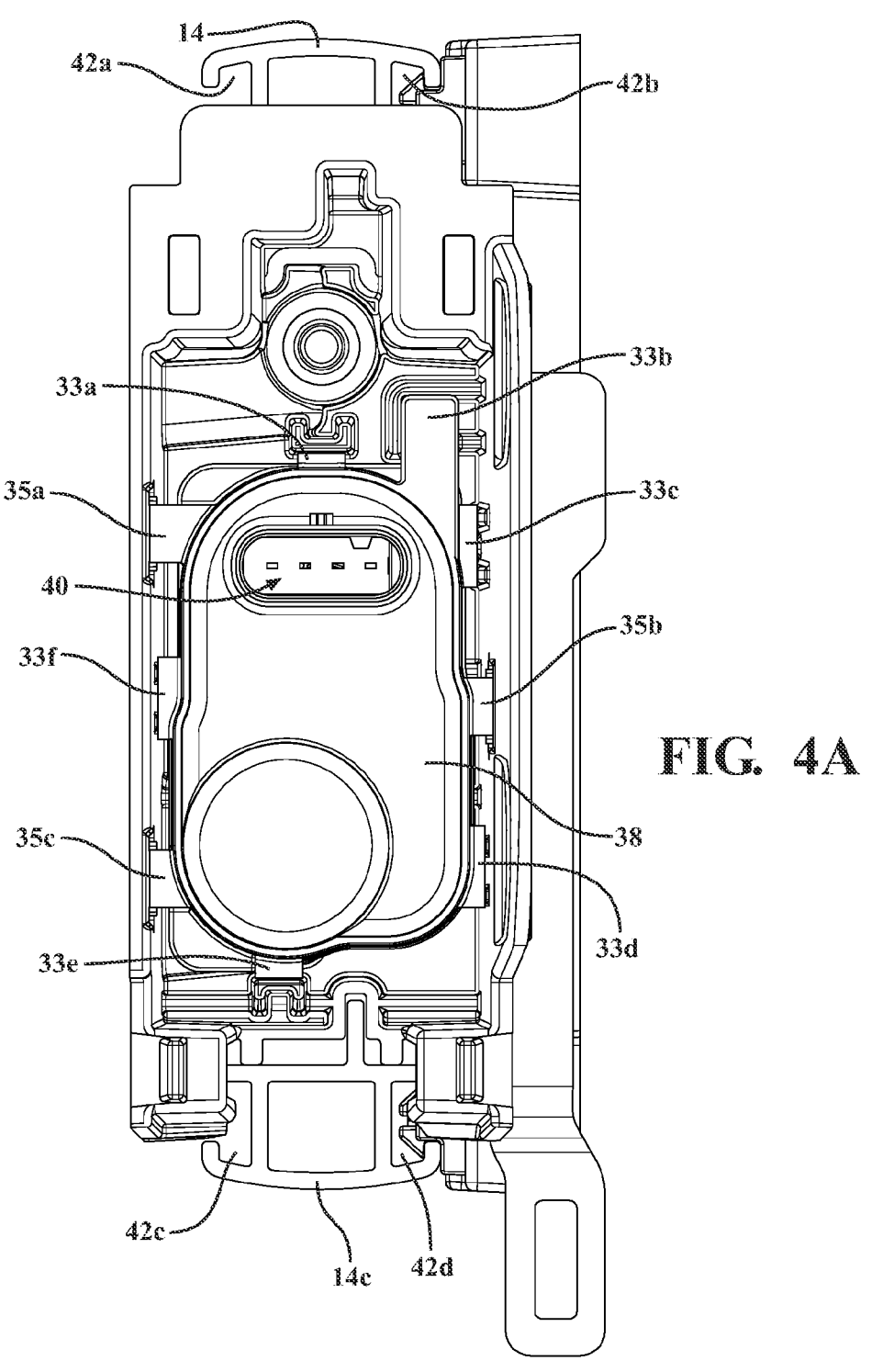
FIG. 4A is an end plan view of the actuator connected to the actuator pocket of the frame.
Figure 4C:
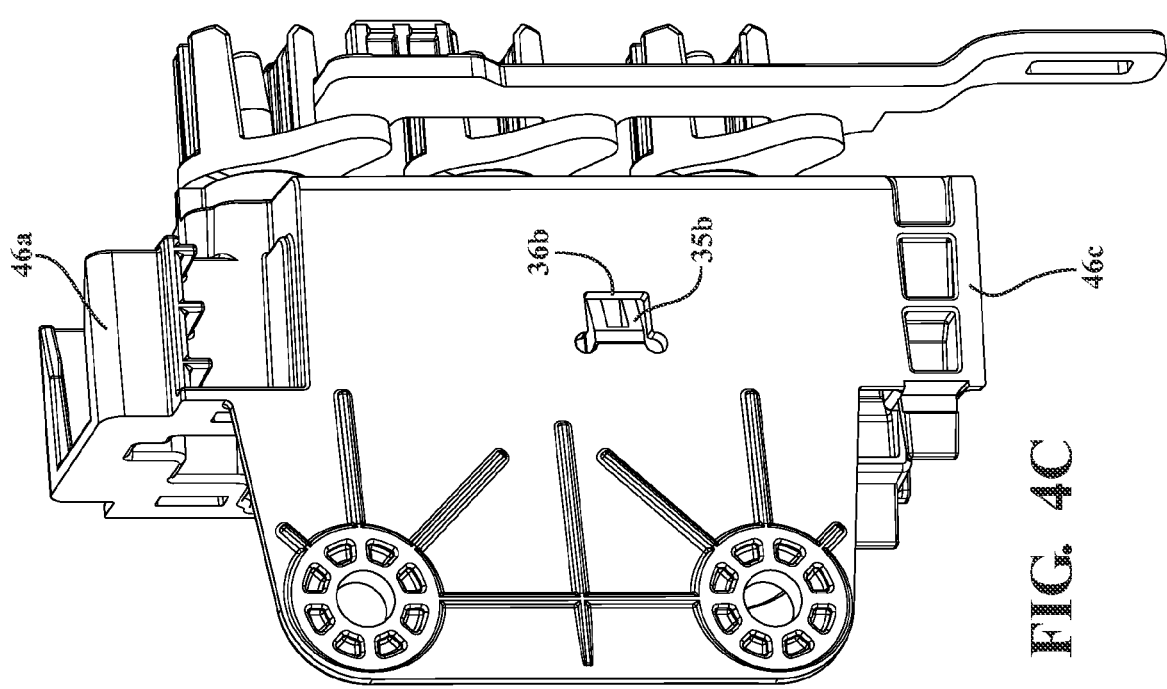
FIG. 4C is a first side perspective view of the actuator connected to the actuator pocket of the frame.
Figure 4B:
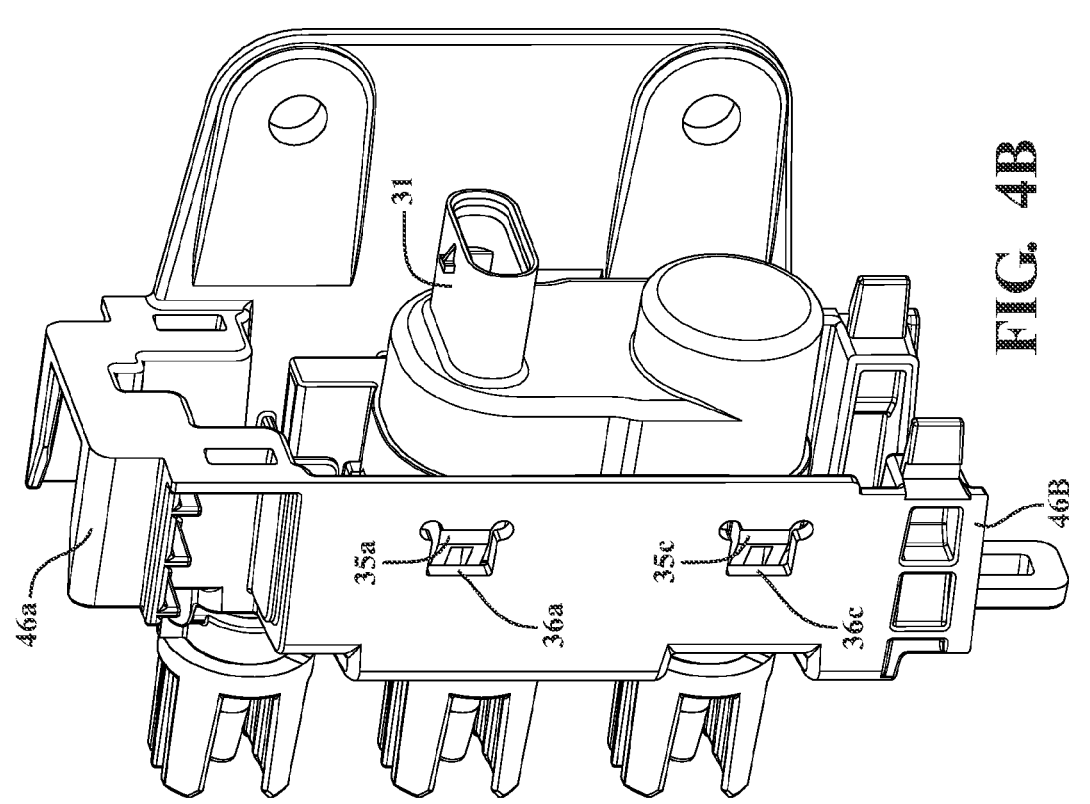
FIG. 4B is a first side perspective view of the actuator connected to the actuator pocket of the frame.
Figure 5:
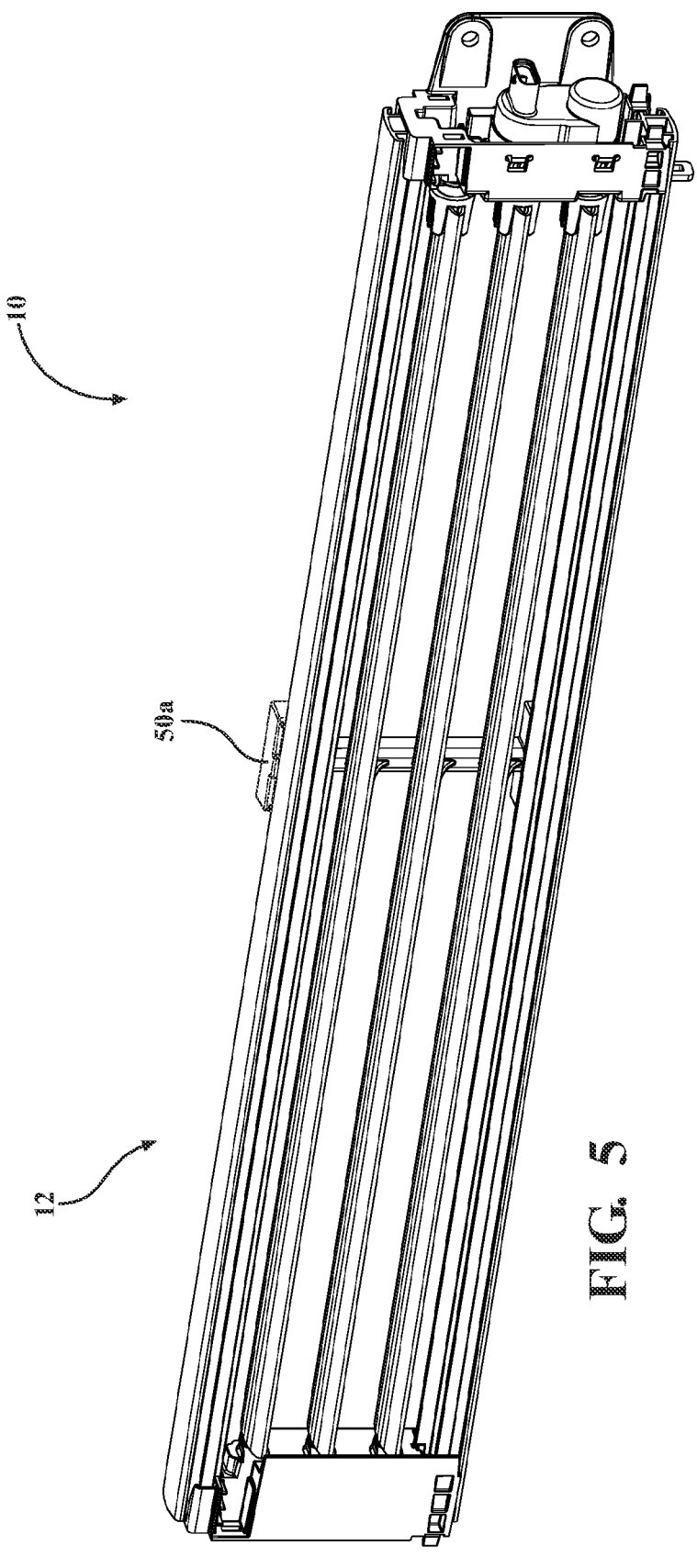
FIG. 5 is first side perspective view of a modular active grille shutter arrangement according to a first embodiment of the invention.

Referring now to FIGS. 4A and 6 the actuator pocket 18 of the first base integrated end cap 14b includes datum cavities 34a, 34b, 34c, 34d, 34e, 34f. A housing 38 of the actuator 30 has datum features 33a, 33b, 33c, 33d, 33e, 33f extending from the housing 38 that align with and slide into the respective datum cavities 34a, 34b, 34c, 34d, 34e, 34f the housing 38 of the actuator 30 during assembly. The datum features 33a, 33b, 33c, 33d, 33e, 33f function to prevent rotation of the housing 38 of the actuator 30 during operation. This is particularly important since the actuator 30 is smaller to fit into a smaller actuator pocket 18, thereby pricing a modular active grille shutter system 10 that is smaller and can have fewer than three vanes.

Referring to FIG. 2, the smaller actuator 30 is possible in part to a stacked gear set 41 that is more compact, together with having a connector 31 formed on the housing 38 that has a connector axis 43 that is parallel to the plurality of output axis 28a, 28b, 28c, instead of being perpendicular to the plurality of output axis 28a, 28b, 28c. Within the housing 38 there is a printed circuit board 39 lead frame that is modified to extend connector wires 40 perpendicular to the printed circuit board 39, thereby allowing the connector 31 to have a connector axis that is parallel instead of perpendicular to the plurality of alternate output axes.

The smaller size of the actuator 30 combined with the torque makes the actuator 30 more susceptible to rotating, but the datum features 33a, 33b, 33c, 33d, 33e, 33f prevent the actuator 30 from rotating in the actuator pocket 18. In addition to the datum cavities 34a, 34b, 34c, 34d, 34e, 34f and datum features 33a, 33b, 33c, 33d, 33e, 33f that help to position and hold the actuator 30, the actuator pocket 18 further includes tunable retention features 29a, 29b, 29c, 29d, 29e, 29f, 29g, 29h, 29i formed on the surface of the actuator pocket 18. The tunable retention features 29a, 29b, 29c, 29d, 29e, 29f, 29g, 29h, 29i as shown are in the form of raised ribs, but can also be wedges, plateaus or other surface features that contact or engage an outer surface of the housing 38 of the actuator 30, to position the actuator at a desired depth or lateral position in the actuator pocket 18. The tunable retention features 29a, 29b, 29c, 29d, 29e, 29f, 29g, 29h, 29i can have different heights, thickness or locations depending on the desired position of the housing 38 in the actuator pocket 18.

To hold the actuator 30 in place there are a plurality of resilient male tabs 35a, 35b, 35c extending from the surface of the housing 38 of the actuator 30. The actuator pocket 18 has one or more apertures 36a, 36b, 36c formed through the surface of the actuator pocket 18 that a respective one of the male tabs 35a, 35b, 35c snap into to hold the housing 38 within the actuator pocket 18.

Connecting conventional actuators to the active grille arrangement involves moving the actuator on more than one degree of freedom. A degree of freedom means the directional variances that must be applied during assembly of the actuator to the conventional active grille shutter system or modular active grille shutter system. Conventional methods use at least two degrees of freedom as the actuator is moved toward the connecting position on the frame, the actuator must be tilted and/or shifted in several directions to ensure that the connector 31 is placed into an aperture on the frame and to align the actuator housing with fastener connection holes on the frame.

The datum features 33*a*, 33*b*, 33*c*, 33*d*, 33*e*, 33*f* and clips 35*a*, 35*b*, 35*c* of the actuator 30 of the present invention provide an improvement over the conventional assembly methods by allowing assembly using what is referred to herein as a single degree of freedom assembly method. The single degree of freedom means that the actuator 30 is moved into engagement so the datum features 33*a*, 33*b*, 33*c*, 33*d*, 33*e*, 33*f* slide into respective datum cavities 34*a*, 34*b*, 34*c*, 34*d*, 34*e*, 34*f* to position the actuator 30 radially aligned within the actuator pocket 18, while simultaneously the male resilient tabs 35*a*, 35*b*, 35*c* of the actuator 30 snap into respective apertures 36*a*, 36*b*, 36*c* of the actuator pocket 18 to lock the actuator 30 into place and prevent the actuator 30 from moving laterally out of the actuator pocket 18. During assembly, the actuator 30 is pushed in one direction into the actuator pocket 18 so that the rotatable output of the actuator 30 is aligned with the select alternate output axis 28*a*, 28*b*, 28*c* and simultaneously connected to the actuator pocket 18 using the male resilient tabs 35*a*, 35*b*, 35*c*. The one degree of freedom assembly is also made possible by the connector axis 43 of the connector 31 being parallel to the alternate output axis 28*a*, 28*b*, 28*c* instead of perpendicular. This parallel positioning eliminates the need to tilt or move the actuator 30 by additional degrees of freedom, since the connector axis 43 is parallel to the plurality of alternate output axes 28*a*, 28*b*, 28*c*, rather than perpendicular to the vane rotation axis as found in conventional actuators used with active grille shutter systems.

Figure 2:
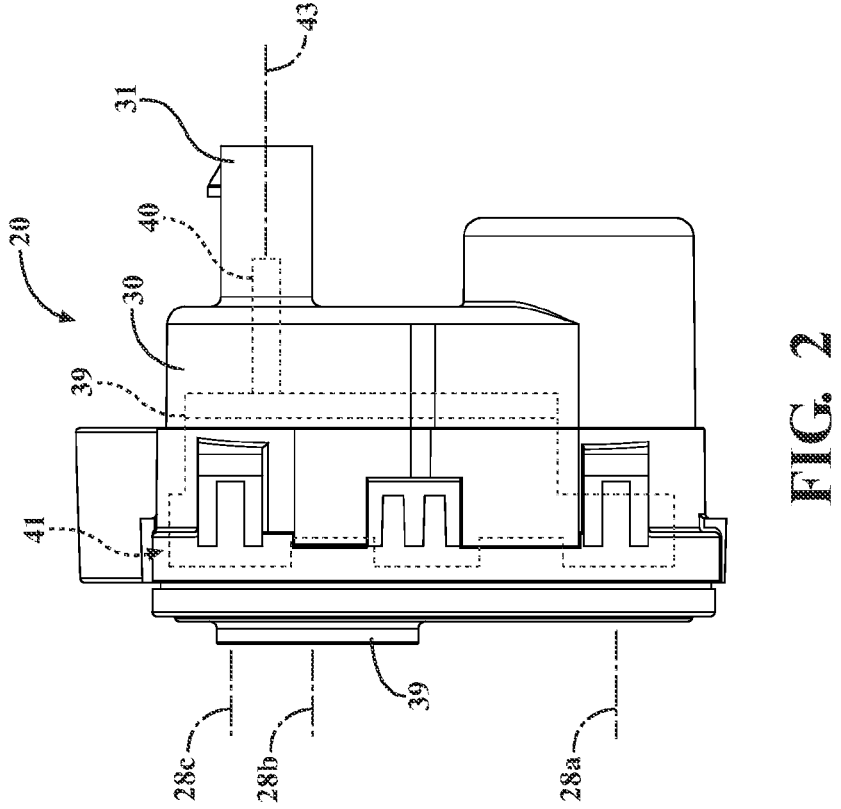
FIG. 2 is a schematic side plan view of the actuator connected to an actuator pocket.

The modular active grille shutter system 10 also includes the plurality of vanes or three vanes 32*a*, 32*b*, 32*c* shown in FIG. 1, extending across the cooling aperture 16 of the frame 12 and rotatably connected to the frame 12 to rotate between an open position where air can move through the frame and a closed position where the vanes 32*a* 32*b*, 32*c* block air from moving through the cooling aperture 16. Each of the vanes 32*a* 32*b*, 32*c* are connected to the vane side 26 of the actuator pocket 18. In the present embodiment of the invention vane 32*b* is in alignment with one of the plurality of alternate actuator output axes 28*a*, 28*b*, 28*c* and functions as a driven vane for the plurality of vanes 32*a*, 32*b*, 32*c*. While vane 32*b* is the driven vane in the present embodiment of the invention it is within the scope of the invention for the driven vane to be any one of the plurality of vanes 32*a*, 32*b*, 32*c*. Another unique feature of the invention is the size of the housing 38 of the actuator 30, which has a width that is no greater than about two millimeters greater than the width of one of the plurality of vanes 32*a*, 32*b*, 32*c*. In a preferred embodiment of the invention the vanes 32*a*, 32*b*, 32*c* each have a width of less than about 35 mm and the width of the housing 38 is about 37 mm or less.

The modular active grille shutter system 10 further includes the actuator 30 housing 38 having a rotatable output 39 positioned in alignment with one of the plurality of alternate actuator output axes 28*a*, 28*b*, 28*c* of the actuator pocket 18. One additional feature of the invention is that the axis of the rotatable output 39 of the actuator 30 can be located at different locations to match up with each of the alternate actuator output axes 28*a*, 28*b*, 28*c*. This is made possible using the stacked gear train 41, where the gears are stacked within the housing 38 rather than a linear layout. This also allows the housing 38 to be smaller and fit into the actuator pocket 18, which has a reduced size compared to conventional active grille systems.

Referring back to all of the figures generally, the first universal rail 14*a* and the second universal rail 14*c* are connected between the first base integrated end cap 14*b* and the first base non-integrated end cap 14*d*. The first universal rail 14*a* and second universal rail 14*c* each form a side of the frame and each have a longitudinal axis with a pair of longitudinal channels 42*a*, 42*b*, 42*c*, 42*d* extending along the longitudinal axis of the first universal rail 14*a* and second universal rail 14*c*. Each of the longitudinal channels 42*a*, 42*b*, 42*c*, 42*d* have a deformable edge opening 44*a*, 44*b*, 44*c*, 44*d* (see FIGS. 3 and 4*a*). The longitudinal channels 42*a*, 42*b*, 42*c*, 42*d* connect to respective first end 46*a* and second end 46*b* on the first base integrated end cap 14*b* and respective first end 48*a* and second end 48*b* on the first base non-integrated end cap 14*d*.

Additionally, as shown throughout the figures there are secondary attachments in the form of center bars 50*a*, 50*b* of different lengths that extend across the opening of the frame and support the frame. The secondary attachments also include an auxiliary mount 52 or mounts used to connect other components such as, but not limited to sensors, microphones, speakers, lights, light detection and ranging modules (i.e., LIDAR), wiring mounts or decorative panels such as grilles. The secondary attachments each have at least one clip 54*a*, 54*b*, 54*c* for connecting to a respective one of the longitudinal channels 42*a*, 42*b*, 42*c*, 42*d* of one of the first universal rail 14*a* or the second universal rail 14*c*. Each clip 54*a*, 54*b*, 54*c* has a pair of posts 56*a*, 56*b*, 56*c*, 56*d*, 56*e*, 56*f*, 56*g* disposed about a spike 58*a*, 58*b*, 58*c*, which are all slightly larger than the respective deformable edge opening 44*a*, 44*b*, 44*c*, 44*d*. The posts 56*a*, 56*b*, 56*c*, 56*d*, 56*e*, 56*f*, 56*g* slide into desired one of the longitudinal channels 42*a*, 42*b*, 42*c*, 42*d* and deform the respective deformable edge opening 44*a*, 44*b*, 44*c*, 44*d* to fix the secondary attachment to the longitudinal channel 42*a*, 42*b*, 42*c*, 42*d*.

The present invention significantly simplifies and reduces the method of assembling the modular active grille shutter system 10. During typical method of assembling modular active grille shutter system 10 the frame, vanes and actuator are all formed separately and then connected together using hand assembly or a combination of automation and hand assembly.

In another aspect of the invention the actuator 30 contains a type of memory chip such as RAM or EPROM. A modular grille software is programmed onto the memory chip. The modular grille software contains a library of pre-encoded operational commands that are stored on the memory chip. The pre-encoded operational commands contain commands for different operational parameters for the actuator to operate the modular active grille shutter system based on various variables including grille size, number of shutters, temperature data, type of system of implementation (e.g., internal combustion engines, electric vehicles, etc.). When the modular active grille shutter system is connected to a vehicle of a specific type the memory chip of the actuator is updated to build an operational program using the pre-encoded commands stored on the memory chip. This way the actuator operation will also be modular because the operational program is assembled using different pre-encoded commands already residing on the memory chip, thereby eliminating the need to separately write new operational software for each vehicle application.

Figure 7A:
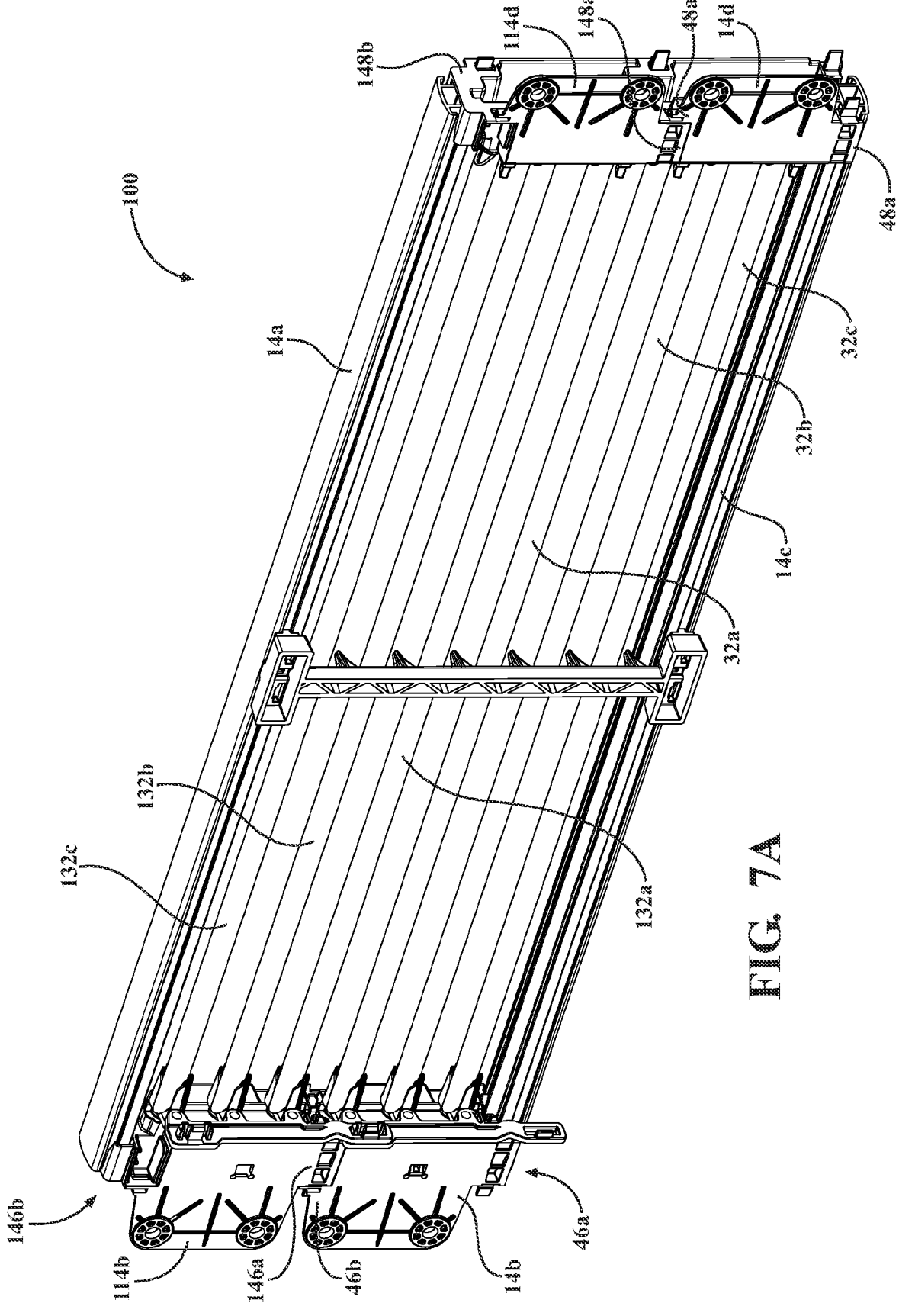
FIG. 7A is first side perspective view of a modular active grille shutter arrangement according to a second embodiment of the invention.
Figure 7B:
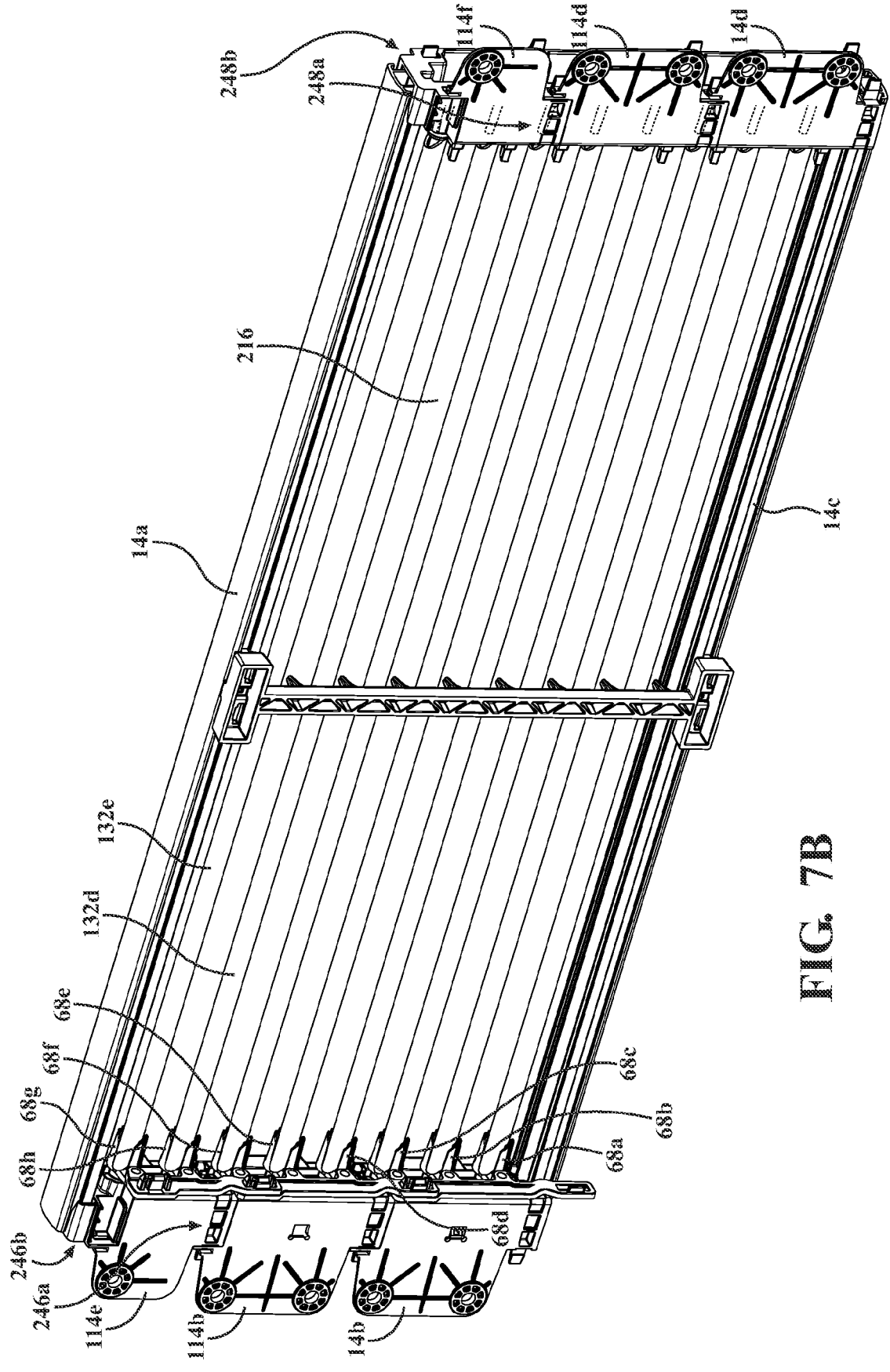
FIG. 7B is first side perspective view of a modular active grille shutter arrangement according to a third embodiment of the invention.
Figures 8A, 8B:
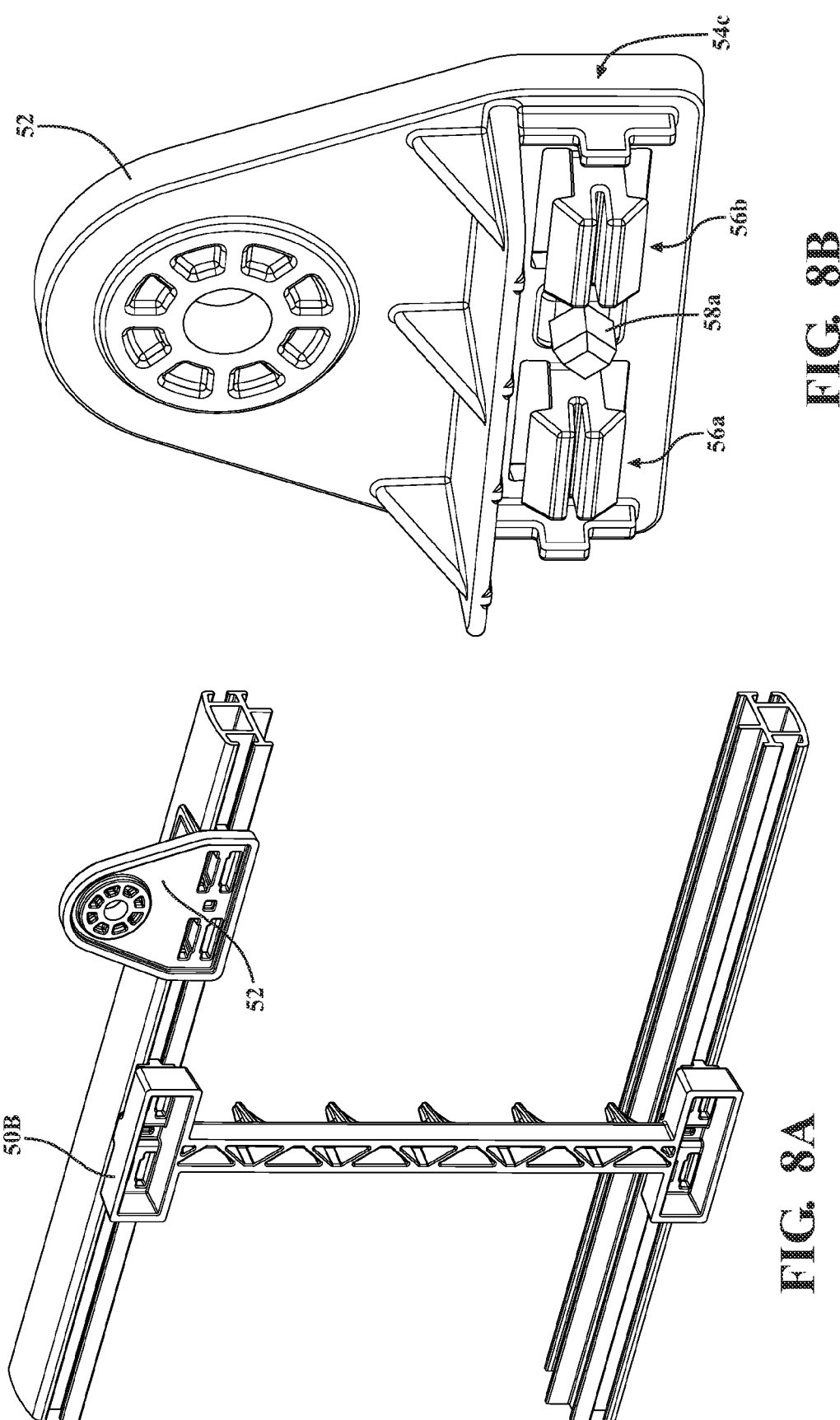
FIG. 8A is a rear side perspective view of a center bar and auxiliary mount connected to the first universal frame rail and the second universal frame rail.
FIG. 8B is a front side perspective view of the auxiliary mount.
Figure 8C:
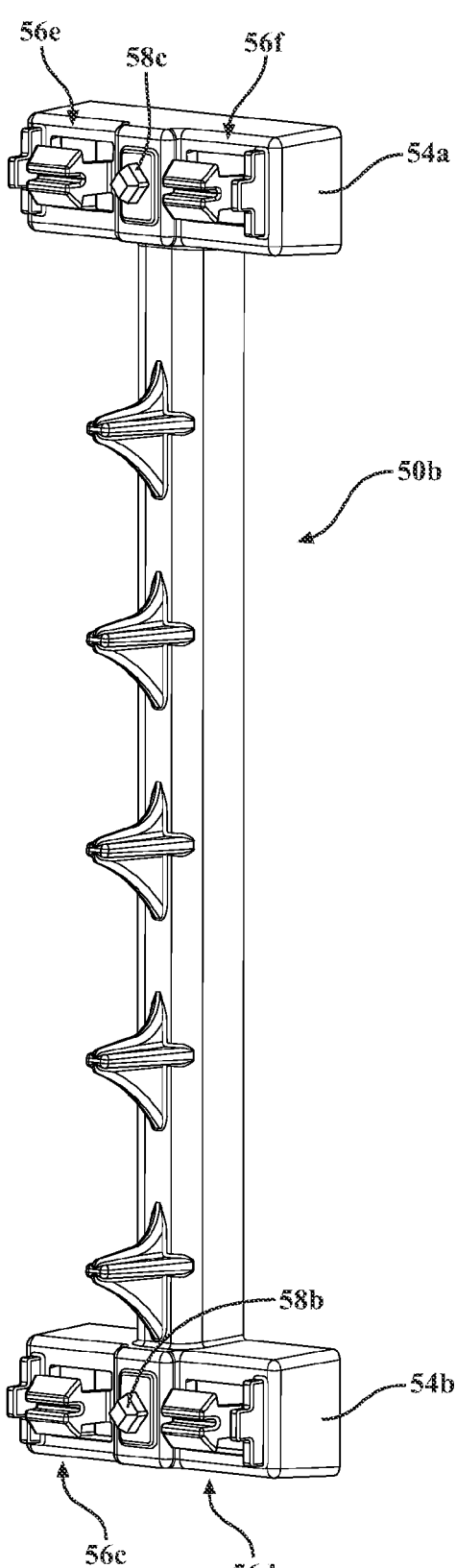
FIG. 8C is a front side perspective view of the center bar.

Referring now to FIGS. 7A and 7B a second and third embodiment showing a modular grille shutter system 100, 200 are shown. The modular grille shutter system 100, 200 utilizes the same components as shown in the modular grille shutter system 10 and builds off the same components to form a frame 112, 212 having an aperture 116, 216 that is larger than frame 12 and aperture 16. Like reference numbers from modular grille shutter system 10 will be carried forward. Modular grille shutter system 100 has six vanes, while modular grille shutter system 200 has eight vanes. Modular grille shutter system 100, 200 both include a second base integrated endcap 114 having a first end 146a and second end 146b. The second end 146b is connected to the first end 46a of the first base integrated end cap 14b. There is also a second base non-integrated end cap 114d having a first end 148a that connects to the second end 48b of the first non-integrated end cap 14d. In modular grille shutter system 100 the first universal frame rail 14a is attached to the second end 146b of the second base integrated end cap 114b and a second end 148b of the second base non-integrated end cap 114d to create a six vane system. The addition of the second based integrated end cap 114b and second base non-integrated end cap 114d increases the area of the frame 112 vertically to add three additional vanes 132a, 132b, 132c.

Modular grille shutter system 200 shown in FIG. 7B is an eight vane system that further includes a first base integrated end cap extension 114e having a first end 246a connected to the second end 146b of the second base integrated end cap 114b. A first non-integrated end cap extension 114f having a first end 248a connected to the second end 148b of the second base non-integrated end cap 114d. The first universal frame rail 14a is connected at one end to a second end 246b of the first base integrated end cap extension 114e, and at a second end of the first universal frame rail 14a is connected to a second end 248b of the first non-integrated end cap extension 114f. Connected between the first base integrated end cap extension 114e and non-integrated end cap extension 114f are vanes 132d, 132e which complete a set of eight vanes for the modular grille shutter system 200.

Referring also to FIGS. 11A, 11B, 11C, 11D, 11E all the connection details of the first end 46a, 146a, 246a, 48a, 148a, 248a and second end 46b, 146b, 246b, 48b, 148b, 248b of the first base integrated end cap 14b, second base integrated end cap 114b, first base integrated end cap extension 114e, first base non-integrated end cap 14d and first non-integrated end cap extension 114f are now shown and described. The first end 46a, 146a, 246a, 48a, 148a, 248a include a male tongue 64a, 64b and hook 66a, 66b on each side. The second end 46b, 146b, 246b, 48b, 148b, 248b have a female connection groove 60a, 60b on each side, each having a snap aperture 62a, 62b with a tab 65a, 65b extending from an edge of the snap aperture 62a, 62b. When a connection is desired the male tongue 64a, 64b slides into the female connection groove 60a, 60b and the hook 66a, 66b slides through the snap aperture 62a, 62b and snaps into place on the respective tab 65a, 65b. The common configuration of the first end 46a, 146a, 246a, 48a, 148a, 248a and second end 46b, 146b, 246b, 48b, 148b, 248b allows for vertically assembling a modular grille shutter system of virtually any height without using fasteners, adhesives, or any additional connections.

Figure 14:
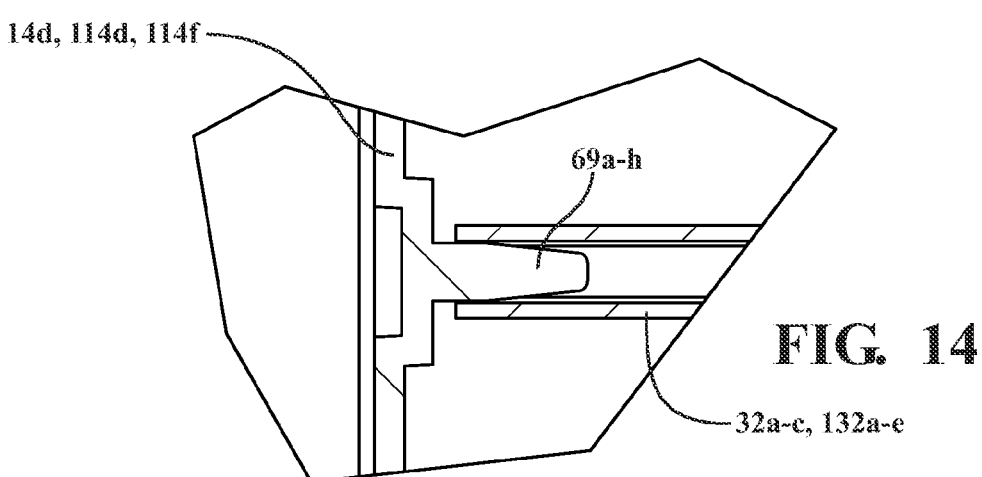
FIG. 14 is an enlarged side cross-sectional view of a vane connected to a post.

In all embodiments of the modular grille shutter system 10, 100, 200 one end of each vane 32a, 32b, 32c, 132a, 132b, 132c, 132d, 132e are each held separately by a vane retainer 68a, 68b, 68c, 68d, 68e, 68f, 68g, 68h rotatably connected to one of the first base integrated end cap 14b, second base integrated end cap 114b, first base integrated end cap extension 114e. As shown best in FIG. 14 a second end of each vane 32a, 32b, 32c, 132a, 132b, 132c, 132d,

132e is slides onto and rotates about a respective post 69a, 69b, 69c, 69d, 69e, 69f, 69g, 69h formed on a respective one of the first base non-integrated end cap 14d, second base non-integrated end cap 114d and first non-integrated end cap extension 114f. The details of the vane retainer and posts are described in United States Patent Application Publication No. US2020/0346538A1 titled "IN MOLD ASSEMBLY FOR ACTIVE GRILLE SHUTTER SYSTEM" filed Mar. 23, 2020; the entire specification and drawings of which are hereby expressly incorporated by reference.

Figure 12:
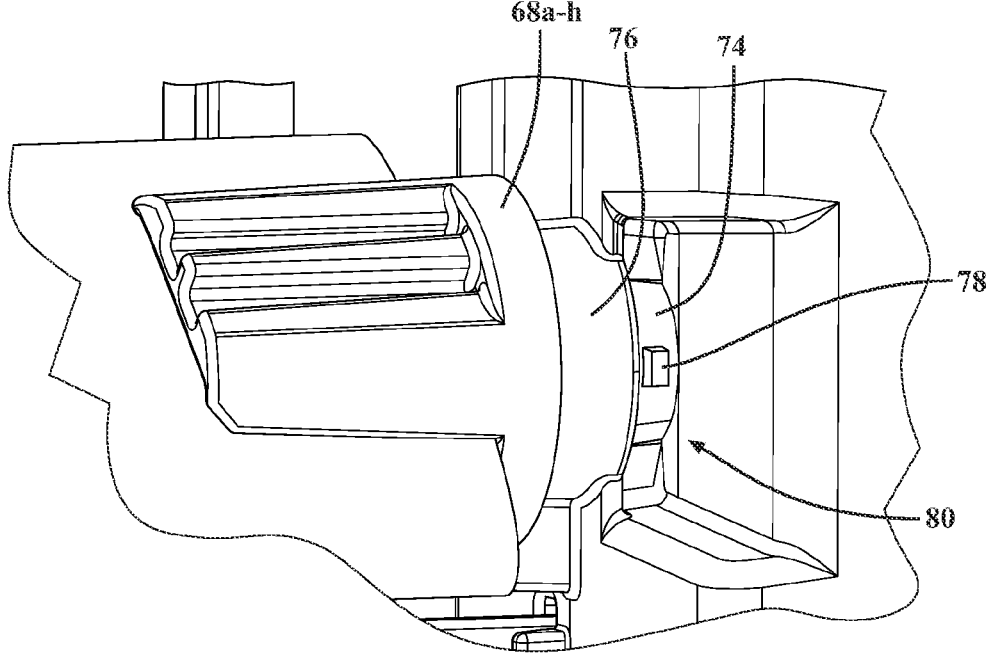
FIG. 12 is an enlarged side perspective view of a vane retainer.
Figure 13:
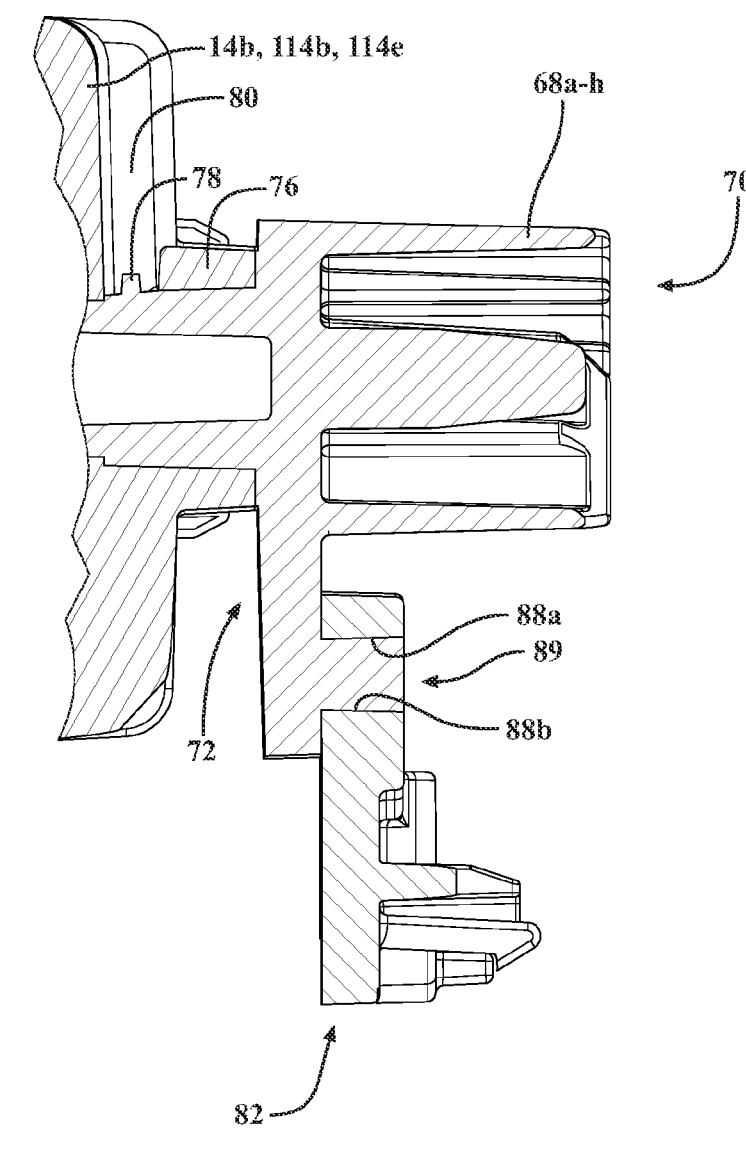
FIG. 13 is an enlarged side cross sectional view of a vane retainer and multi-piece link arm attached.

Referring now to FIGS. 12 and 13 additional features of each vane retainer 68a, 68b, 68c, 68d, 68e, 68f, 68g, 68h are now described. Each vane retainer 68a, 68b, 68c, 68d, 68e, 68f, 68g, 68h include a vane connection side 70 and an end cap connection side 72 rotatably fixed to the respective one of the first base integrated end cap 14b, second base integrated end cap 114b, first base integrated end cap extension 114e. Each vane retainer 68a, 68b, 68c, 68d, 68e, 68f, 68g, 68h can optionally include a post 74 that rotatably extends into a collar 76 formed on one of the first base integrated end cap 14b, second base integrated end cap 114b, first base integrated end cap extension 114e. Each post 74 has a stop 78 that extends from an outer radius of the post 74 and is positioned in a collar groove 80 formed in the collar 76 that allows the vane retainer 68a, 68b, 68c, 68d, 68e, 68f, 68g, 68h, stop 78 and the post 74 to rotate, while preventing the post 74 from sliding out of the collar 76.

Figure 9:
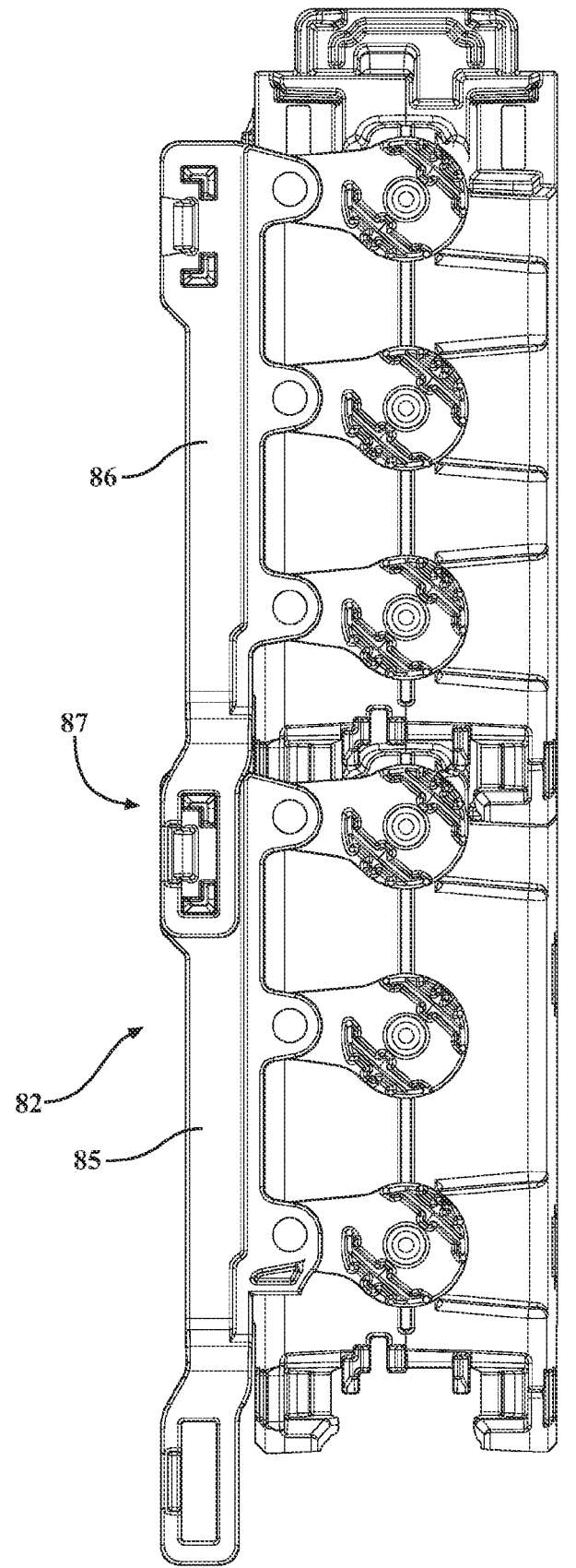
FIG. 9 is a side plan view of the first based end cap, second base end cap and multi-piece link arm.

Referring now to FIGS. 9 and 10A-D, the details of a multi-piece link arm 82 are now described. Since the modular grille shutter system 10, 100, 200 can have different vertical heights it is necessary to transfer operational force from the actuator 30 to all of the vanes 32a, 32b, 32c, 132a, 132b, 132c, 132d, 132e, which is accomplished using the vane retainer 68a, 68b, 68c, 68d, 68e, 68f, 68g, 68h and the multi-piece link arm 82. In order to transfer force from the actuator 30, in the present embodiment vane 32b is what is connected to the rotatable output 39 through the vane retainer 68b using a direct connection. Referring to FIG. 9, in order to transfer force each vane retainer 68a, 68b, 68c, 68d, 68e, 68f has a link pin 84a, 84b, 84c, 84d, 84e, 84f formed on each vane connection side 70. The multi-piece link arm 82 as shown has a first piece 85 and second piece 86 connected together by a link connection 87. The first piece 85 connects rotatably to link pin 84a, 84b, 84c, while second piece 86 connects rotatably to link pin 84d, 84e, 84f. Each link pin 84a, 84b, 84c, 84d, 84e, 84f of vane retainer 68a, 68b, 68c, 68d, 68e, 68f has a reverse draft 88a, 88b (shown in FIG. 13) formed on the outer diameter that extends through a link aperture 89 formed on the multi-piece link arm 82. The reverse draft 88a, 88b is formed during the molding process and rotatably and securely connects the multi-piece link arm 82 to each vane retainer 68a, 68b, 68c, 68d, 68e, 68f to they cannot easily be separated and do not rely on other connection means such as retainers or adhesives.

Figure 10A:
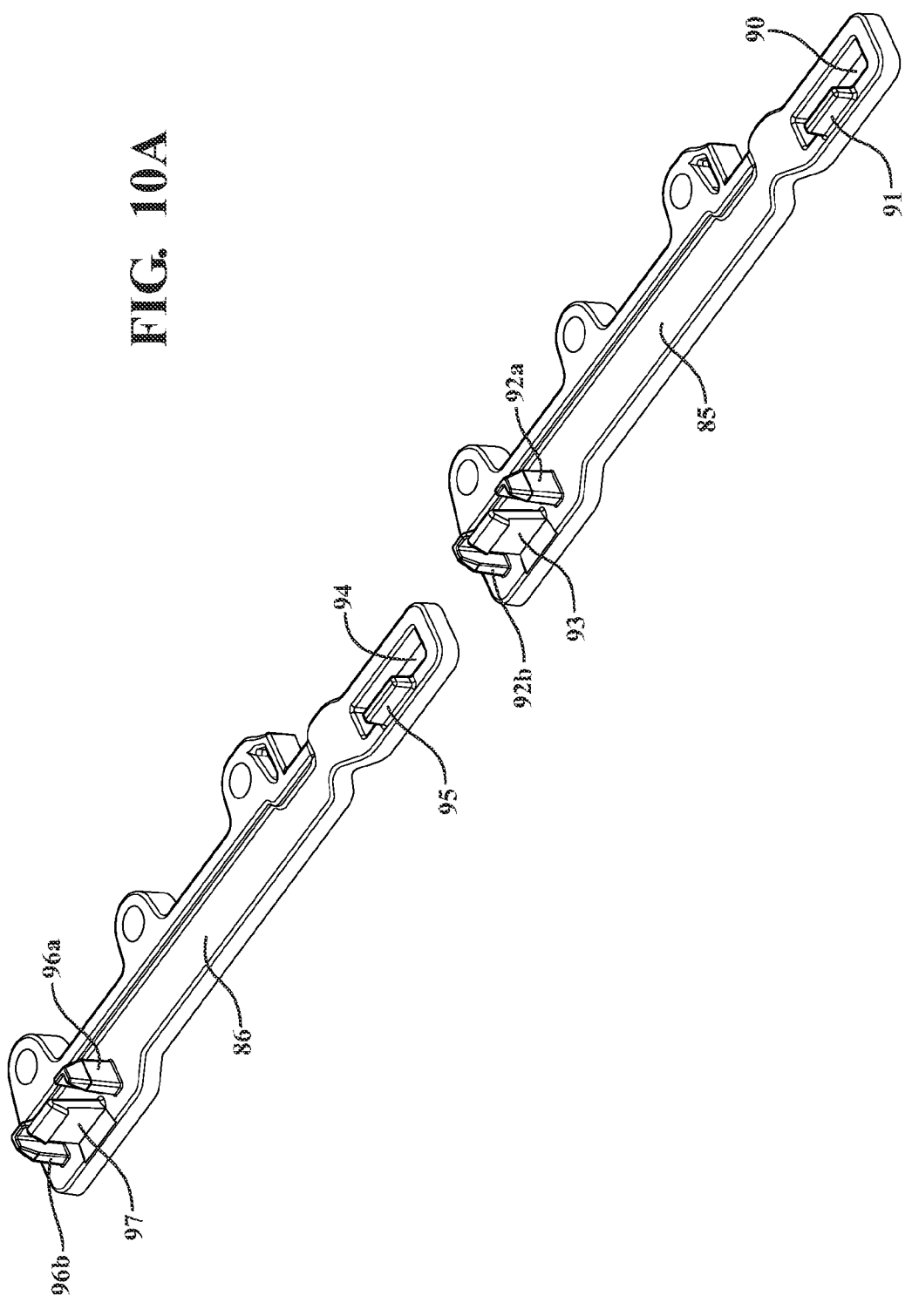
FIG. 10A is an exploded side perspective view of the multi-piece link arm.
Figure 10B:
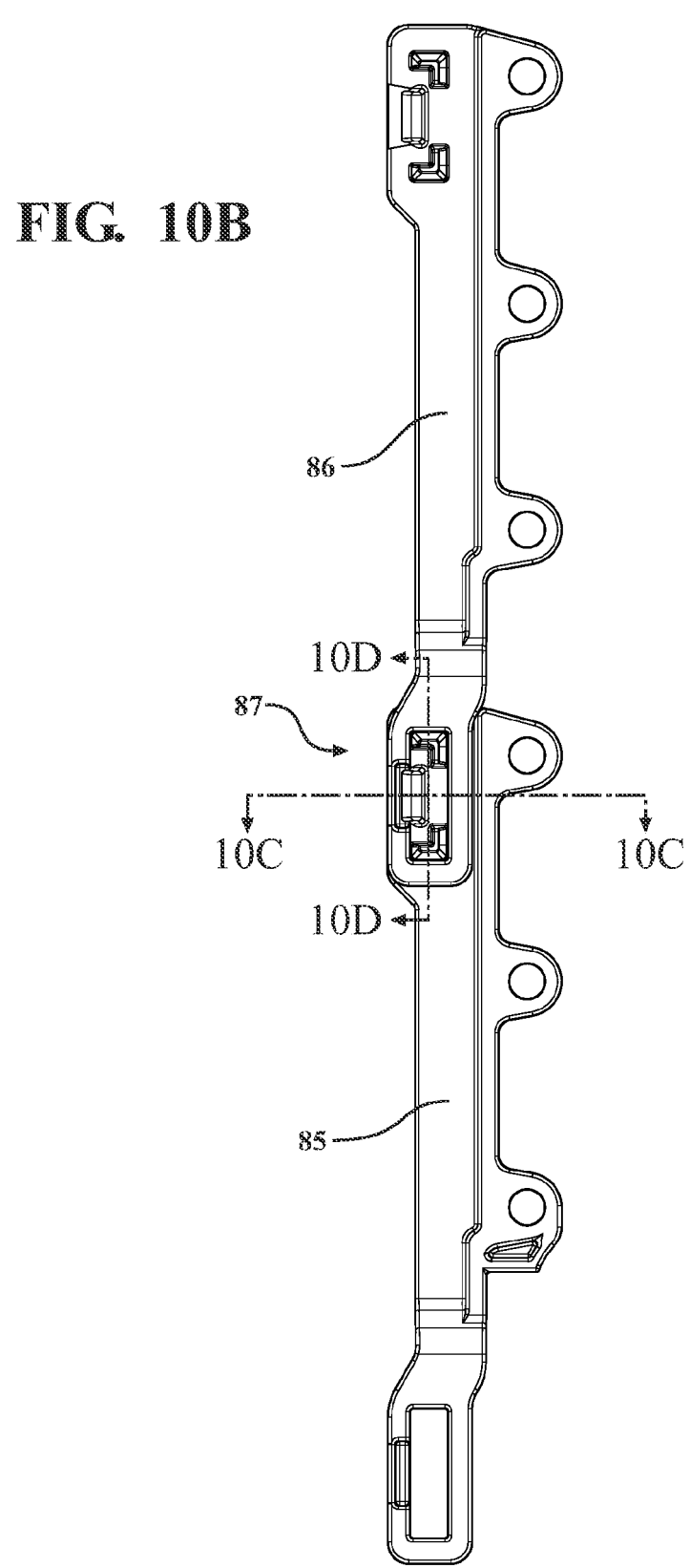
FIG. 10B is a side plan view of an assembled multi-piece link arm.
Figure 10D:
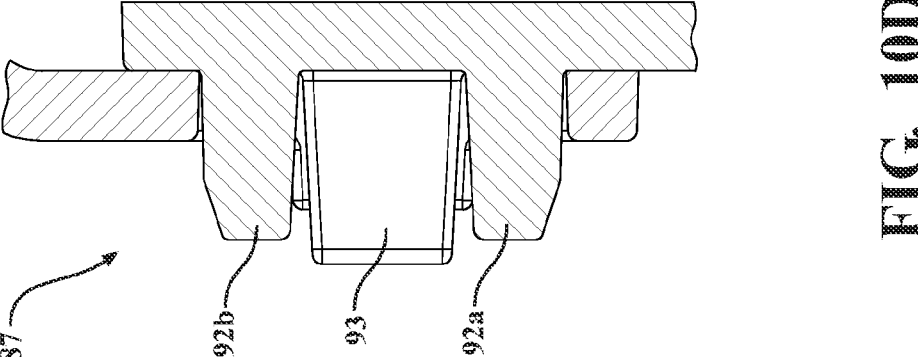
FIG. 10D is an enlarged cross-sectional second side view of a link connection.
Figure 10C:
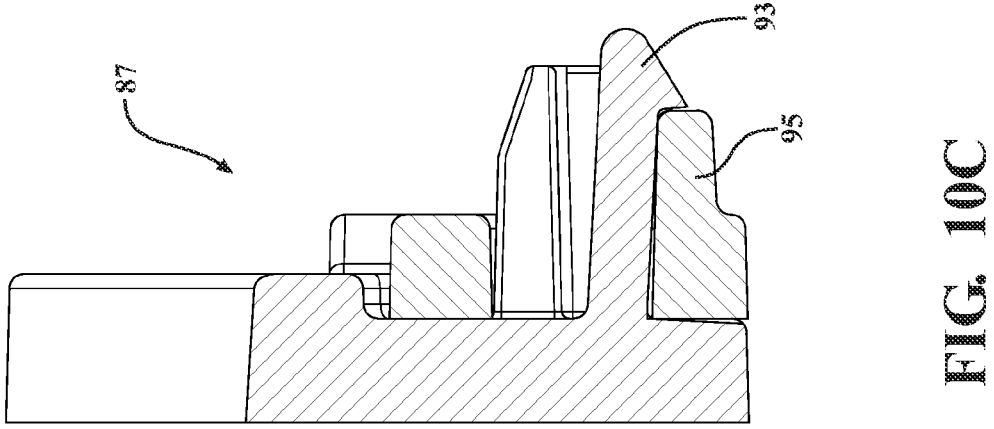
FIG. 10C is an enlarged cross-sectional first side view of a link connection.
Figure 11A:
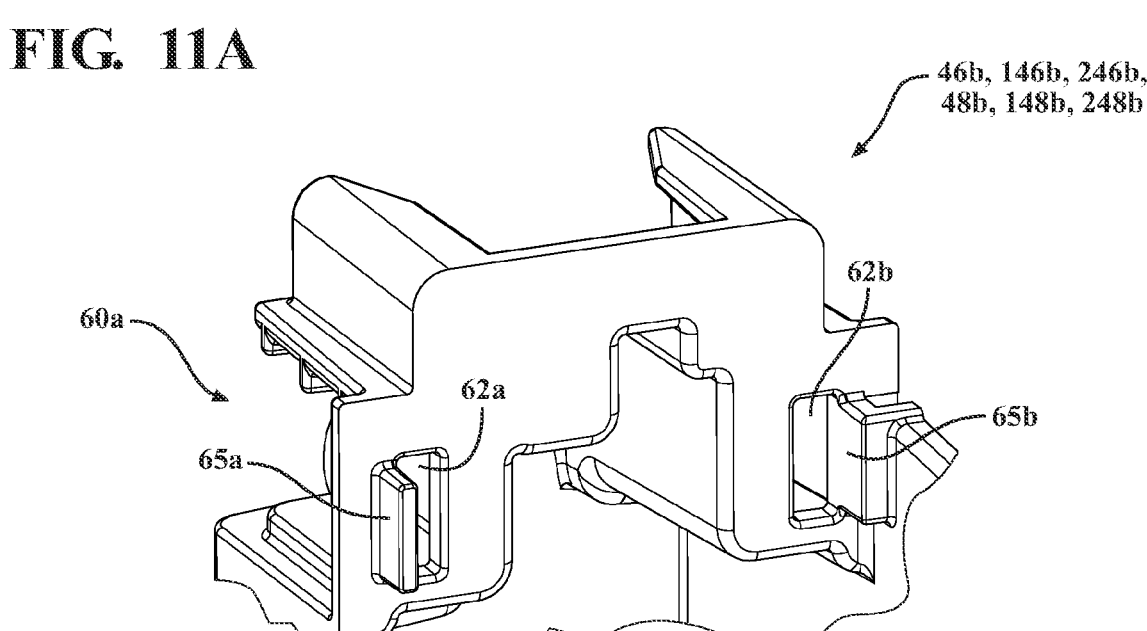
FIG. 11A is a first side perspective view of a first end of a second connection.
Figure 11B:
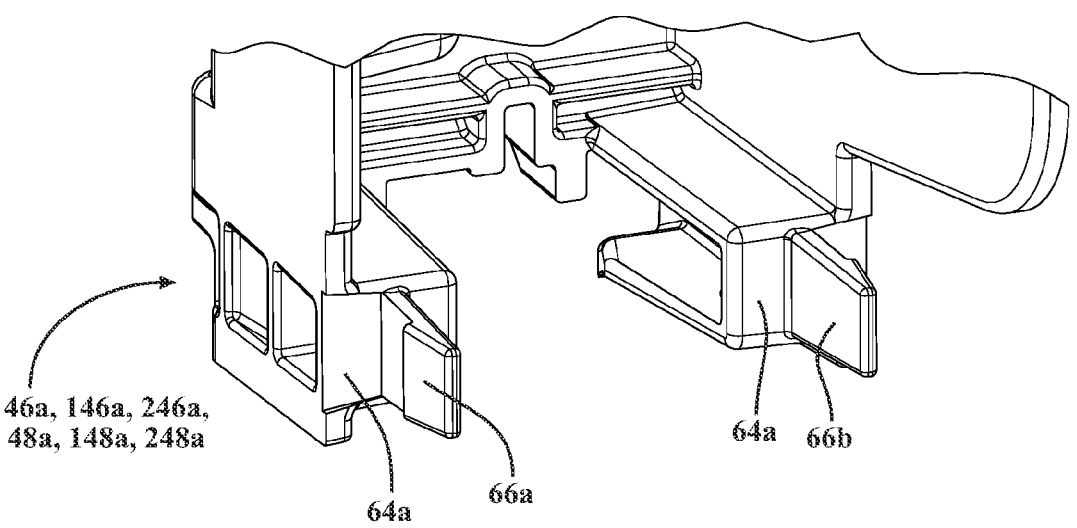
FIG. 11B is a first side perspective view of a second end of a first connection.
Figure 11C:
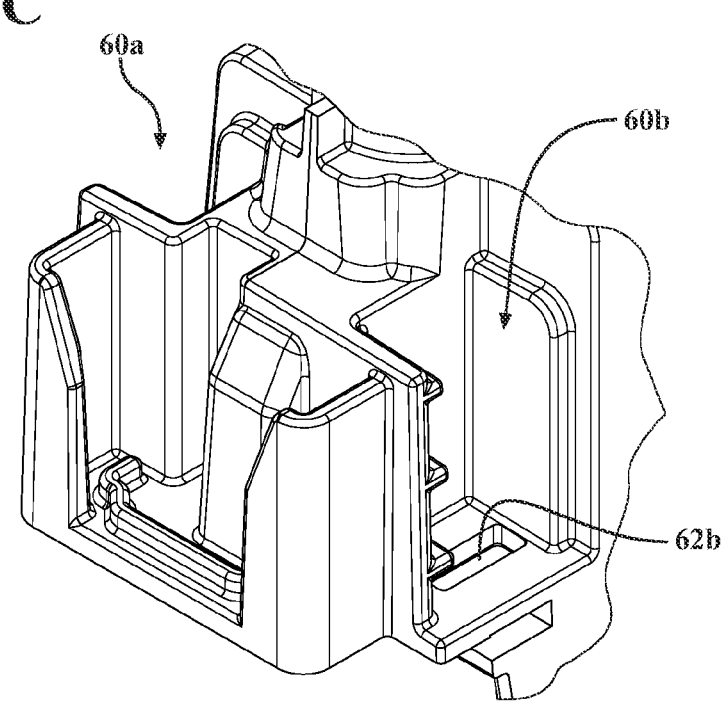
FIG. 11C is a second side perspective view of the first end of the second connection.
Figure 11D:
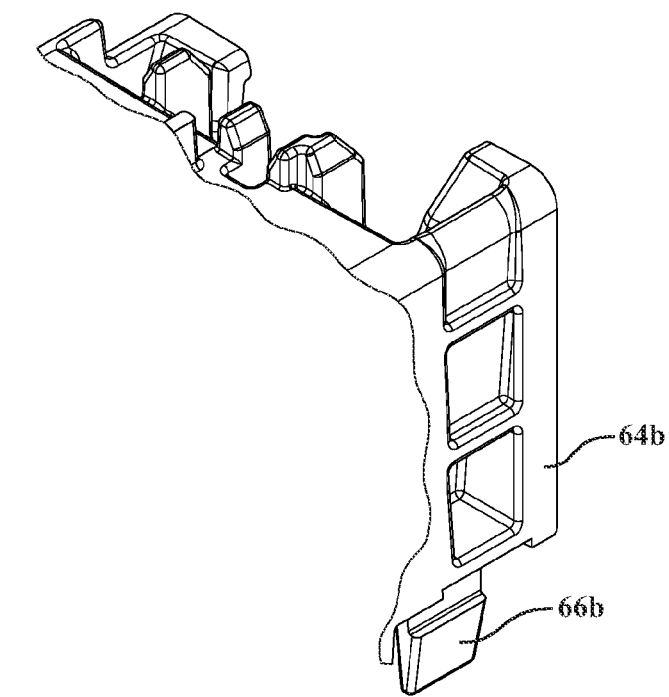
FIG. 11D is a second side perspective view of a first end of the first connection.
Figure 11E:
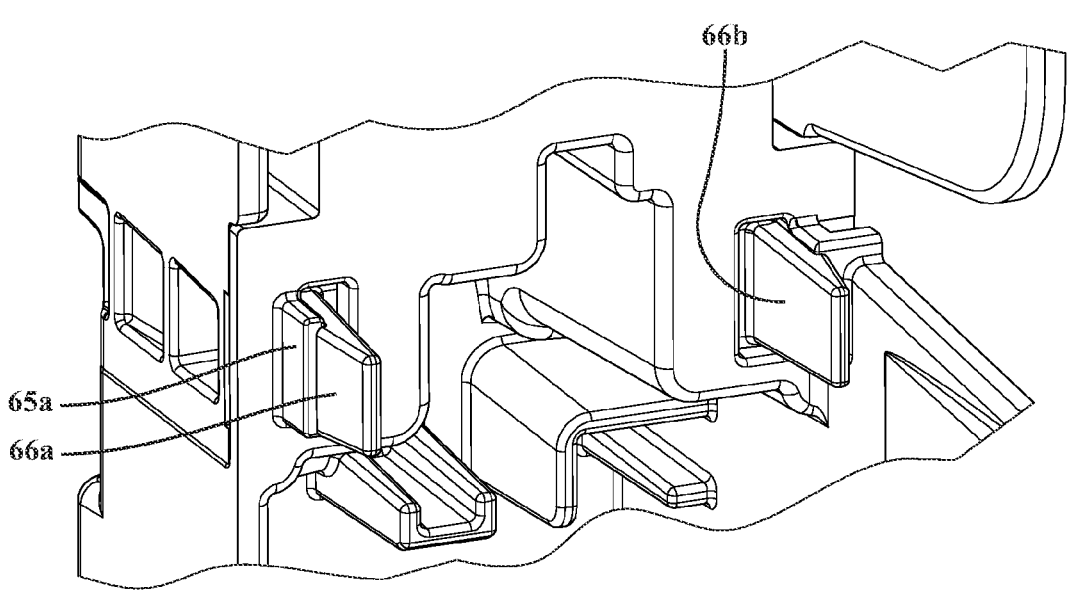
FIG. 11E is a first side perspective view of the first connection and second connection together.

Referring now to FIGS. 10A-C additional details of the multi-piece link arm 82 are shown. The first piece 85 and second piece 86 are connected together using the link connection 87. In embodiments having additional vanes requiring additional pieces of the multi-piece link arm, additional link connections similar to the link connection 87 are used. The link connection 87 as shown includes a link aperture 90 formed on the first piece 85 at a first end and has a tab 91 extending from an edge surface of the link aperture 90. The first piece 85 also has a second end with two alignment posts 92a, 92b and a single flexible tang 93 extending from the surface. The second piece 86 as shown includes a link aperture 94 formed on the second piece 86 at a first end and has a tab 95 extending from an edge surface of the link aperture 94. The second piece 86 also has a second end with two alignment posts 96a, 96b and a single flexible tang 97 extending from the surface. The first end of the second piece 86 engages the second end of the first piece 85 such that the two alignment posts 92a, 92b and flexible tang 93 slide through the link aperture 94 of the second piece 86, and the flexible tang 93 bends and locks to the tab 95 extending from the edge surface, to lock the first piece 85 to the second piece 86. If needed the aperture 90 and tab 91 of the first piece 85 can be used to connect additional pieces on the other side of the first piece 85, while the two alignment posts 96a, 96b and single flexible tang 97 can be used to connect additional pieces to the second side of the second piece 86.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular active grille shutter system comprising:
an active grille shutter system having a frame located in a cooling pathway of a power source for a vehicle, wherein the frame includes a base integrated end cap and a base non-integrated end cap, wherein the base non-integrated end cap has an actuator pocket with a surface having a plurality of alternate actuator output axes located within the actuator pocket, wherein the actuator pocket includes a first side wall extending from the vane connection side and a second sidewall extending from the vane connection side opposite the first sidewall, wherein the first sidewall includes a first aperture and a first datum cavity and the second sidewall includes a second aperture and a second datum cavity;
a plurality of vanes rotatably connected at a first end to the base end cap and extending across the cooling pathway and connected at a second end to the base non-integrated end cap, wherein the plurality of vanes rotate between an open position and a closed position;
an actuator having a housing with a rotatable output, wherein the aperture and rotatable output are formed at a location that is alignable with one of the plurality of alternate output axes, wherein the actuator is operably connected to the plurality of vanes such that rotation of the actuator output will rotate the plurality of vanes;
a first datum feature and a second datum feature extending from the housing of the actuator, wherein radial movement of the actuator in the actuator pocket is prevented when the actuator is positioned in the actuator pocket the first datum feature extends into the first datum cavity of the first sidewall, the second datum feature extends into the second datum cavity of the second sidewall, and the third datum feature extends into the third datum cavity of the second sidewall;
a first resilient male tab and a second resilient male tab extending from the housing of the actuator, wherein lateral movement of the actuator in the actuator pocket is prevented when the actuator is positioned in the actuator pocket and the first male tab extends through the first aperture of the first sidewall, the second male tab extends through the second aperture of the second sidewall, and
one or more tunable retention features formed on the surface of the actuator pocket that engage an outer surface of the housing of the actuator when connected to the actuator pocket, wherein the one or more tunable retention features prevent the housing from rotating within the actuator pocket by engaging the outer surface of the housing of the actuator at one or more gap locations between the actuator housing and a surface of the actuator pocket.

2. The modular grille shutter system of claim 1 further comprising:
a connector formed on the actuator housing, the connector having a connector axis that is parallel to the plurality of alternate output axes.

3. The modular grille shutter system of claim 1 further comprising:
one or more additional apertures formed on the surface of the actuator pocket; and
one or more additional resilient male tabs extending from the housing of the actuator for snapping into a respective one of the one or more apertures of the actuator pocket.

4. The modular grille shutter system of claim 1 wherein the housing of the actuator has a width that is no greater than about two millimeters greater than the width of one of the plurality of vanes.

5. The modular grille shutter system of claim 1 wherein the frame further comprises:
a first universal rail and a second universal rail each connected at a first end to the base end cap and at a second end to the base non-integrated end cap, the first universal rail and second universal rail each form a side of the frame having a longitudinal axis with a longitudinal channel extending along the longitudinal axis, wherein the longitudinal channel has a deformable edge opening; and
a secondary attachment having at least one clip for connecting to the longitudinal channel of one of the first universal rail or the second universal rail, wherein the at least one clip has at least one post larger than the deformable edge opening, wherein the at least one post slides into the longitudinal channel and deforms the deformable edge opening to fix the secondary attachment to the longitudinal channel.

6. The modular grille shutter system of claim 5 wherein the secondary attachment is an auxiliary mount used to mount a secondary component.

7. The modular grille shutter system of claim 6 wherein the secondary attachment is a center bar that extends across an opening of the frame to provide support to the frame.

\* \* \* \* \*